(No Model.)

P. CONYNGHAM.
BAND PULLEY.

No. 423,132. Patented Mar. 11, 1890.

Witnesses
Geo. E. Fuch.
H. J. Riley.

Inventor
Philip Conyngham
By his Attorneys
C. A. Snow & Co.

UNITED STATES PATENT OFFICE.

PHILIP CONYNGHAM, OF WILKES-BARRÉ, PENNSYLVANIA, ASSIGNOR OF ONE-HALF TO WM. R. GIBBONS, OF SAME PLACE.

BAND-PULLEY.

SPECIFICATION forming part of Letters Patent No. 423,132, dated March 11, 1890.

Application filed November 21, 1889. Serial No. 331,056. (No model.)

*To all whom it may concern:*

Be it known that I, PHILIP CONYNGHAM, a citizen of the United States, residing at Wilkes-Barré, in the county of Luzerne and State of Pennsylvania, have invented a new and useful Band-Pulley, of which the following is a specification.

My invention relates to improvements in band-pulleys, and has for its object the provision of a pulley in which the wear on the pulley and the belt will be reduced to a minimum, and which will be so constructed that broken or worn-out parts will be repaired or replaced without destroying the utility of the pulley and necessitating the provision of an entirely new pulley.

The invention consists in certain novel features hereinafter described and claimed.

Figure 1:
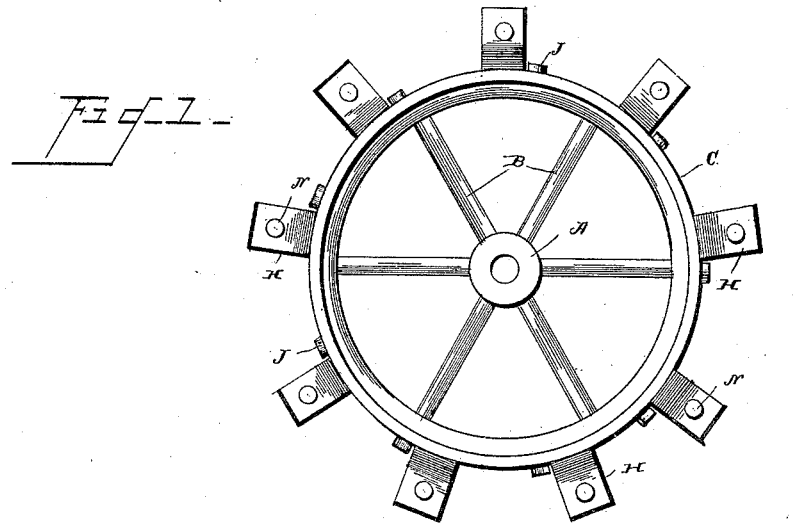
Figure 2:
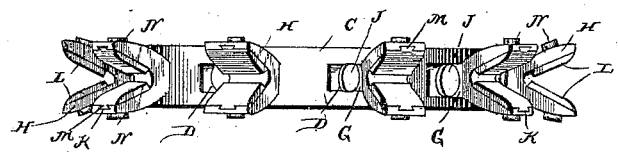
Figures 3, 4, 5:
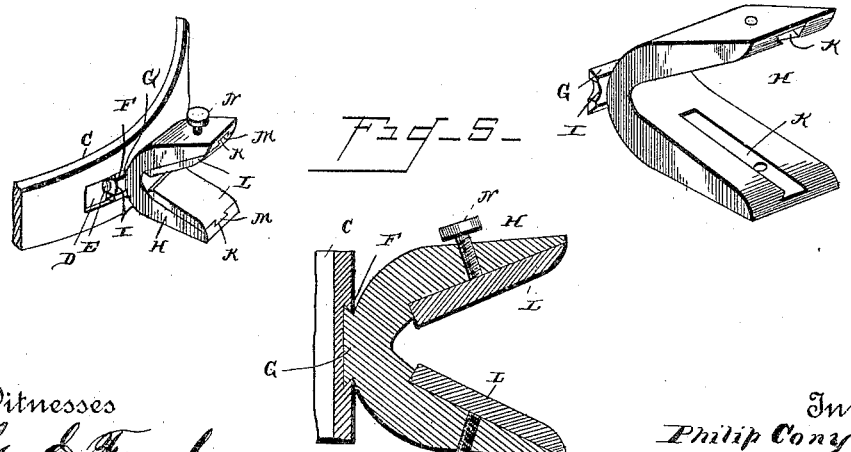

In the accompanying drawings, Figure 1 is a side view of my improved pulley. Fig. 2 is an edge view of the same. Fig. 3 is a detail perspective view of a portion of the pulley and one of the belt-supports. Fig. 4 is a perspective view of the removable block, and Fig. 5 is a detail sectional view of the same.

In carrying out my invention I employ a hub A, which is of the usual construction and has the ordinary spokes B radiating therefrom. The rim C is formed integral with or secured to the spokes in the usual manner, and is provided in its outer side with a series of longitudinally-arranged grooves D and the transverse openings or perforations E, which pass through the rim near the ends of the groove. The grooves are each provided near the end opposite the end where the opening E is disposed with the overhanging dovetailed lips F, and these lips are engaged by a dovetailed rib G at the bottom of the base or block H of the belt-support. This rib is provided at one end with a notch I, and a set-screw J is inserted through the said notch and the transverse openings in the rim, so as to secure the blocks in place. These bases or blocks are V-shaped in edge view, and the inner faces of their sides are provided with the longitudinal dovetailed grooves K, and plates L, having dovetailed ribs M on their outer sides, are fitted in and upon the said blocks by having the said dovetailed ribs engaged in the grooves K. Set-screws N are mounted in the sides of the V-shaped blocks and bear on the outer faces of the plates L to secure the same in place.

The construction and arrangement of my improved pulley being thus made known, the advantages of the same, it is thought, will be readily understood. The belt is placed around the pulley so as to run in the spaces between the plates carried by the V-shaped blocks, which are clearly shown in Figs. 1 and 2. By this arrangement the surface over which the belt is arranged is reduced to about one-half of what it would be if the belt were allowed to run over the rim of the pulley, so that the wear on the rope and the pulley is reduced to a minimum. By passing the belt over a series of blocks, as shown and described, the belt is caused to bend more sharply than if it were passed over an entire curved surface, and consequently slipping of the belt will be obviated and the mechanism more positively driven. Should one of the plates be broken, it can be readily removed and a new one substituted without affecting any of the other parts of the device, and if it be desired to use a very large band the plates may be entirely removed and the belt allowed to run over the V-shaped blocks. If it should be desired to remove one of the V-shaped blocks, this can be readily accomplished by withdrawing the set-screw J and then sliding the block to that end of the groove, after which the block can be readily lifted from the wheel.

My device is very simple in its construction, can be manufactured at a slight cost, and its advantages are thought to be obvious.

Having thus described my invention, what I claim, and desire to secure by Letters Patent, is—

1. In a pulley, the rim provided with V-shaped blocks having dovetailed grooves K in their inner faces and the removable and adjustable plates L, dovetailed to fit said grooves, in combination with set-screws passing inwardly through the sides of said blocks and bearing against the outer faces of said plate, substantially as described.

2. A band-pulley provided in its rim with a series of longitudinal grooves and transverse openings, the V-shaped blocks having their bases fitting in the said grooves and provided with notches in their ends, and the set-screws inserted through said notches and the transverse openings in the rim, as set forth.

3. The combination, with the pulley provided in its rim with the longitudinal grooves having overhanging dovetailed lips at one end and openings E near the other end, of the V-shaped blocks having dovetailed ribs at their lower ends adapted to engage the overhanging lips, the set-screw inserted in said opening in the rim of the pulley, the plates removably fitted upon the V-shaped blocks, and the set-screws mounted in the blocks and bearing against the said plates, as set forth.

In testimony that I claim the foregoing as my own I have hereto affixed my signature in presence of two witnesses.

PHILIP CONYNGHAM.

Witnesses:
WM. R. GIBBONS,
JOHN F. MCMAHON.